Oct. 20, 1970    N. R. BROWNYER    3,534,951

TAPERED SPRING LEAF

Original Filed Aug. 22, 1968    2 Sheets-Sheet 1

INVENTOR
Nelson R. Brownyer

BY Strauch, Nolan, Neale, Nies & Kurz
ATTORNEYS

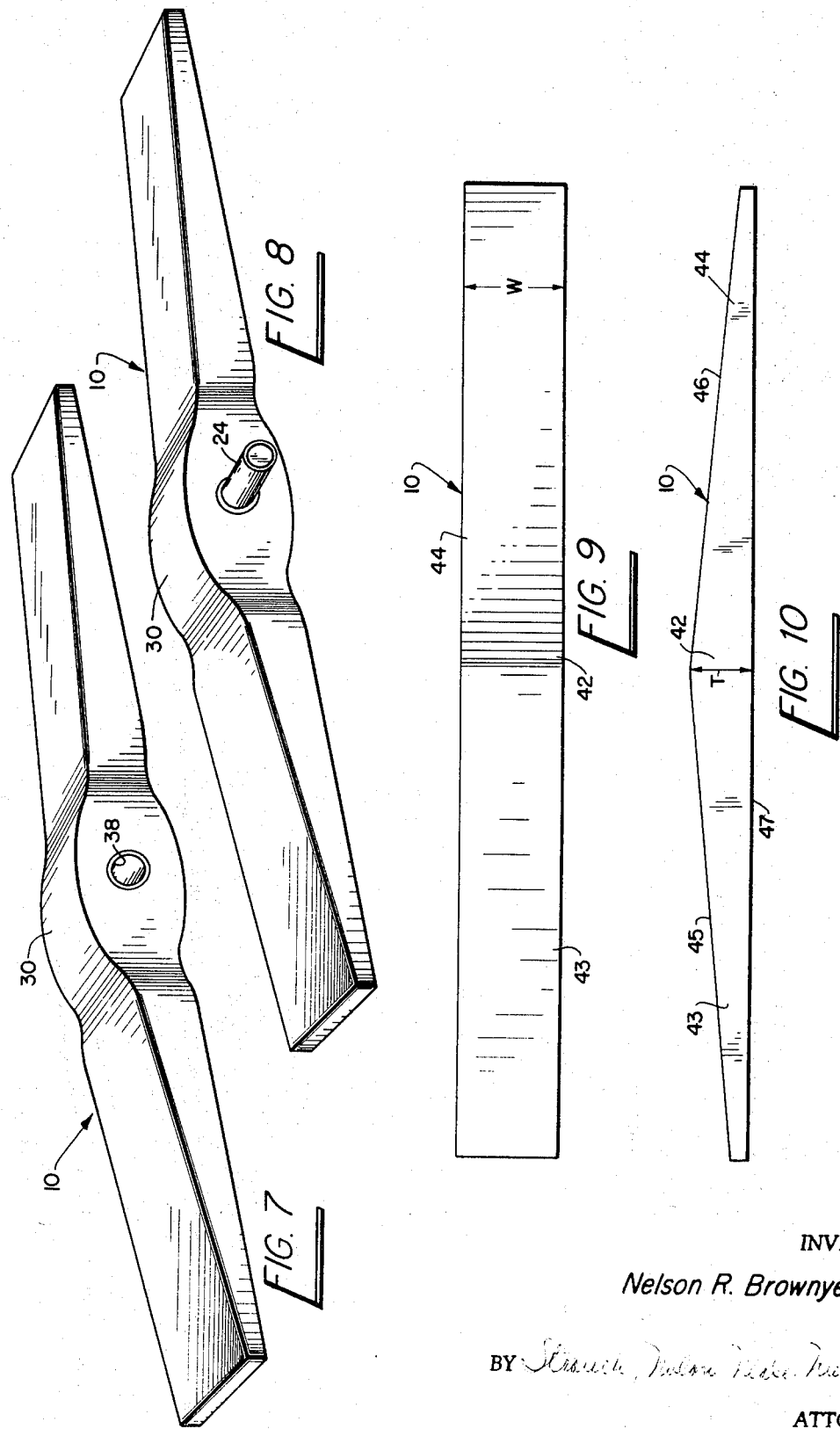

United States Patent Office 3,534,951
Patented Oct. 20, 1970

1

3,534,951
TAPERED SPRING LEAF
Nelson R. Brownyer, Birmingham, Mich., assignor to North American Rockwell Corporation, Pittsburgh, Pa., a corporation of Delaware
Original application Aug. 22, 1966, Ser. No. 574,193. Divided and this application June 28, 1968, Ser. No. 770,876
Int. Cl. B60g 5/06
U.S. Cl. 267—47    6 Claims

ABSTRACT OF THE DISCLOSURE

A spring steel beam for a vehicle suspension comprising a relatively thick center portion and end sections that taper in decreasing cross section thickness from the center portion toward the ends thereof, the end sections being of the same constant width and said center portion being narrower than the end sections and having a transverse bore wherein a trunnion pin is press fitted.

---

This is a division of my copending application Ser. No. 574,193 filed Aug. 22, 1966 for Tapered Leaf Spring and Method of Making.

This invention relates to leaf spring suspensions for motor vehicles and more particularly to a heavy duty spring leaf having a special integral center structure strong enough to enable it to be transversely pivoted, as may be required for equalizer beam and suspension applications, and the method of making the same.

The spring leaf of the invention is decreasingly tapered from a maximum thickness center portion toward both ends and the center portion is reduced in width transversely of the longitudinal axis of the leaf to displace metal sufficiently to adequately increase the thickness at that center portion for mounting a trunnion pin adapted to be journalled in suitable bearings in a trunnion bracket on the vehicle. In the specific embodiment herein described the trunnion pin is mounted in an opening formed through the increased thickness center portion. In a related application Ser. No. 574,200 filed of even date herewith the trunnion pin comprises opposite ends welded onto opposite sides of the increased thickness center portion.

Beams for vehicle suspensions have been proposed, these usually comprising a rigid steel member centrally pivoted on the frame and mounted in resilient bearings or ball and socket joints at the axle connected ends. These beams were primarily provided to transfer driving and braking torque reactions to the frame and link the axles together in fixedly spaced relation longitudinally of the vehicle, but they added undesirably to the unsprung dead weight of the vehicle. To resiliently support the vehicle load and absorb road shocks, relatively large multi-leaf spring assemblies had to be used in conjunction with such rigid beams.

The present invention provides a novel resilient load supporting beam as the suspension wherein it performs many of the combined functions of the combination rigid beams and multileaf spring assemblies. The dead weight of the suspension is greatly reduced, increasing the load carrying capacity of the vehicle. Less space is needed for installation than for the more complex conventional constructions.

The resilient beam of the invention is in effect a heavy tapered spring leaf having a central portion of reduced width and material increased thickness having oppositely extending trunnion pin ends, and it is a major object of the invention to provide such a beam.

It is another object of the invention to provide a novel resilient integral beam construction wherein the beam is a tapered spring leaf of constant width except for a restricted central waist portion where it is appreciably thicker than the remainder of the leaf and mounts a trunnion structure for pivotal mounting in a vehicle or the like.

A further object of the invention is to provide a novel spring beam according to the foregoing wherein the thickened center portion is formed with a trunnion pin mounting opening.

Other novel features will appear as the following detailed description proceeds with reference to the accompanying drawings in which:

FIG. 7 is a generally perspective view of the spring beam of FIG. 3;

FIG. 8 is a perspective view similar to FIG. 7 but showing a trunnion pin inserted through the center opening of the beam; and FIGS. 9 and 10 are respectively plan and side elevation views showing the beam in a preliminary form.

Figure 1:
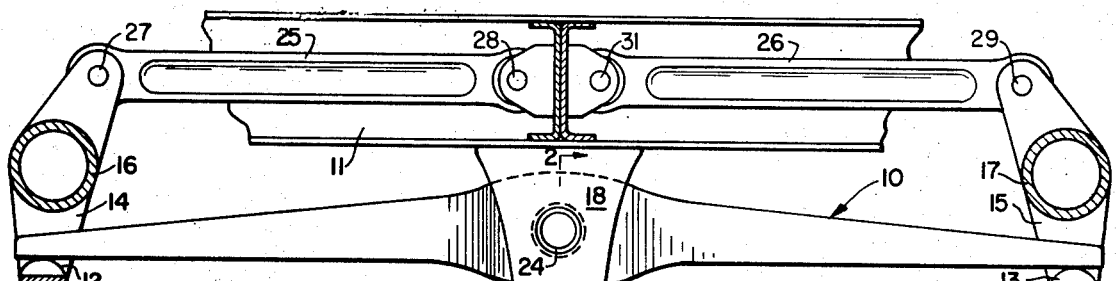
FIG. 1 is a side elevation illustrating a spring beam of the invention installed in a representative suspension.

Spring beam 10 is shown in FIG. 1 in a representative vehicle suspension installation. A beam 10 at each side of the vehicle is centrally pivoted on the frame 11 and the beam ends rest slidably on suitable wear pads 12 and 13 provided on brackets 14 and 15 rigid with tandem axle housings 16 and 17 respectively.

Figure 2:
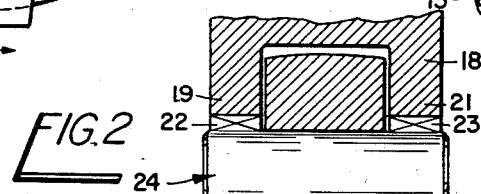
FIG. 2 is a fragmentary view in section through line 2—2 of FIG. 1.

The frame support of beam 10 comprises a depending trunnion bracket 18 rigid with frame 11, and bracket 18 as shown in FIG. 2 has parallel arms 19 and 21 mounting aligned bearings 22 and 23 respectively supporting opposite ends of a trunnion pin 24 rigid with beam 10.

The ends of spring beam 10 may be notched and supported in brackets 14 and 15 by the pivot block arrangements disclosed in Bixby et al. Pat. No. 2,999,695.

Torque rods 25 and 26 extend between axles 16 and 17 respectively and the vehicle frame. Rod 25 has conventional pivot connections to axle 16 at 27 and to the frame at 28. Rod 26 has conventional pivot connections to the axle 17 at 29 and to the frame at 31. These torque rods function to maintain the tandem axle spacing longitudinally of the vehicle, and to transmit brake and drive torque reactions directly to the frame.

Figure 3:
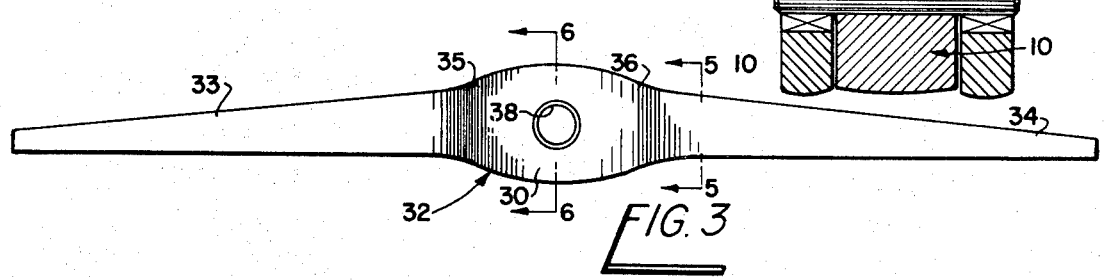
FIG. 3 is a side elevation showing a spring beam apart from the assembly.
Figure 4:
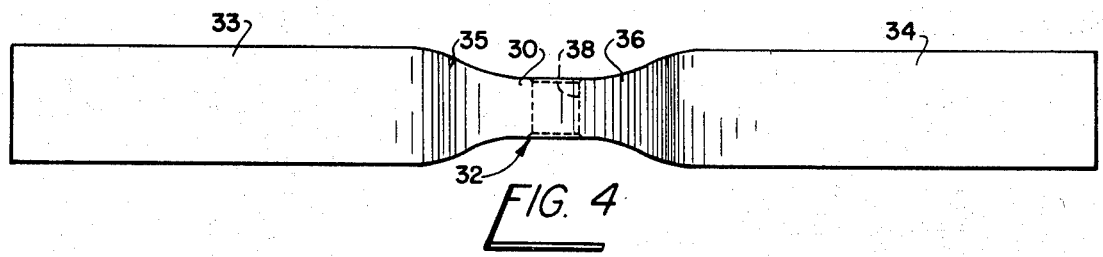
FIG. 4 is a top plan view of the beam of FIG. 3.
Figure 5:
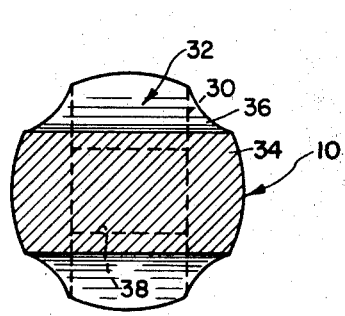
FIG. 5 is a section through the spring beam substantially along line 5—5 of FIG. 3.

Beam 10 is made of a good grade of spring steel. As shown in FIG. 4 the beam is of constant width from end to end except for a laterally restricted reduced width central waist portion 32. As shown in FIGS. 3 and 4, the beam 10 at the middle of waist portion 32 is a substantially uniform minimum width section 30 of materially greater thickness than the opposite end sections 33 and 34 which are tapered and gradually reduce in thickness toward the beam ends. The thickest beam section 30 is integral with the constant width end sections 33 and 34 and connected to them by transition sections 35 and 36 which, as shown in FIGS. 3 and 4, are of gradually changing width and thickness and merge smoothly at opposite ends into the adjoining beam sections.

The thickest beam section 30 is formed with a central transverse cylindrical bore 38 which has its axis perpendicular to the length of the beam 10, and this bore has press fitted therein the cylindrical trunnion pin 24 (FIG.

6) having oppositely projecting ends 39 and 41 that fit into bearings 22 and 23 in the suspension assembly of FIG. 1.

Beam 10 is preferably made by first taper rolling and treating a length of steel stock according to the method disclosed in Greene et al. Pat. No. 3,238,072, using for example the taper rolling machine of Krause Pat. No. 3,145,591 for the taper rolling operation. This produces a spring beam 40 of constant width W having a thicker center section 42 of thickness T from which taper the opposite end sections 43 and 44 as shown in FIGS. 9 and 10. The surfaces 45 and 46 are the taper rolled surfaces, and the surface 47 is straight from one end of the spring leaf blank to the other.

Optionally the constant width tapered spring beam of FIGS. 9 and 10 may be formed by flame cutting from bar stock as disclosed and claimed in the copending application of Willard F. Perdue et al. Ser. No. 587,607 filled Sept. 12, 1966 where heavy duty spring beams not conveniently taper rolled are required.

After the spring beam 40 has been formed as shown in FIGS. 9 and 10, the central portion 42 of the beam is hot forged in a hydraulic press in a direction transverse to the longitudinal axis of the beam with pressure exerted in a horizontal plane from both sides of the beam towards the central axis thereof to provide the restricted waist section 32 of FIG. 4 which is of materially but gradually decreased width and increased thickness relative to the remainder of the beam. By this operation metal is displaced vertically to form the thickest center section 30 and the transition sections 35 and 36. The opposite side faces 48 and 49 of the thicker section 30 (FIG. 6) are flat and parallel to the longitudinal axis of the spring beam.

Bore 38 is then formed through thick section 30 with its axis at right angles to faces 48 and 49. Bore 38 may be chamfered at 51 at both ends to facilitate the insertion of the trunnion pin 24, which is suitably non-rotatably press fitted therein. The ends 39 and 41 of the trunnion pin 24 project on both sides out of bore 38 for insertion into the bearings on vehicle bracket 18 where they are rotatably retained so that upon assembly spring beam 10 pivots within bracket 18.

Bore 38 is preferably formed after heat treatment of spring beam 10 to insure that there will be no change in the accurate dimension of the formed bore and thus insure proper fit with the trunnion pin.

The steps of grinding the beam surfaces, shot peening the ground surfaces at the tension side of the spring beam, and bulldozing disclosed in said Letters Patent No. 3,238,072 may be performed before or after the formation of waist section 32.

The restricted waist section 32 may allow a slight diagonal flexing of beam 10 when the suspension is digonally articulated, which may be advantageous to reduce bearing loads. Bore 38 with or without the inserted pin 24 greatly facilitates handling of the relatively heavy spring beam 10 for in-shop transporting and during shipment.

Figure 6:
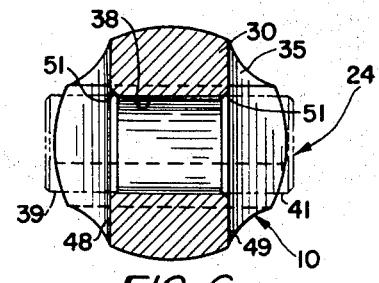
FIG. 6 is section through the spring beam substantially along line 6—6 of FIG. 3.

The redistribution of metal effected by the formation of waist section 30 provides an integral metal cross section of sufficient strength around the bore 38 for adequate trunnion pin support, and the lateral restriction of the waist section 32 enables bracket 18 to be narrower and provide adequate support for the beam while reducing the bracket size and weight. As shown in FIG. 6, the trunnion pin ends lie substantially within the lateral bounds of the width of the beam, so that a compact arrangement results.

The present invention may be embodied in other forms without departing from the spirit and essential characteristic thereof, therefore, the present embodiments are considered in all respects as illustrative only and not restrictive, the scope of the invention being indicated by the appended claims rather than by the foregoing description.

What is claimed and desired to be secured by Letters Patent is:

1. An integral spring steel beam comprising a relatively thick center portion and end sections that taper in decreasing cross section thickness from the center portion toward the ends thereof, said end sections being of the same constant width and said center portion being narrower than the end sections.

2. The spring beam defined in claim 1, wherein said center portion is connected to said end sections by integral transition sections of changing width and thickness.

3. The spring beam defined in claim 1, comprising trunnion means rigid with said center portion and oppositely projecting therefrom.

4. The spring beam defined in claim 3, wherein said center portion is formed with a transverse bore and said trunnion means is a pin fixed in said bore.

5. The spring beam defined in claim 3, including a trunnion pin press fitted within said bore and having opposite bearing mounting portions projecting from opposite sides of said beam center portion.

6. A spring steel beam as defined in claim 1, wherein said center section is of minor length and is mainly of uniform width.

References Cited
UNITED STATES PATENTS 3,190,632    6/1965    Barenyi _____ 267—47
3,376,033    4/1968    Sherwood _____ 267—47

JAMES B. MARBERT, Primary Examiner